(No Model.)
G. F. PARKER & C. E. CRAPO.
SECONDARY BATTERY.
No. 470,701. Patented Mar. 15, 1892.
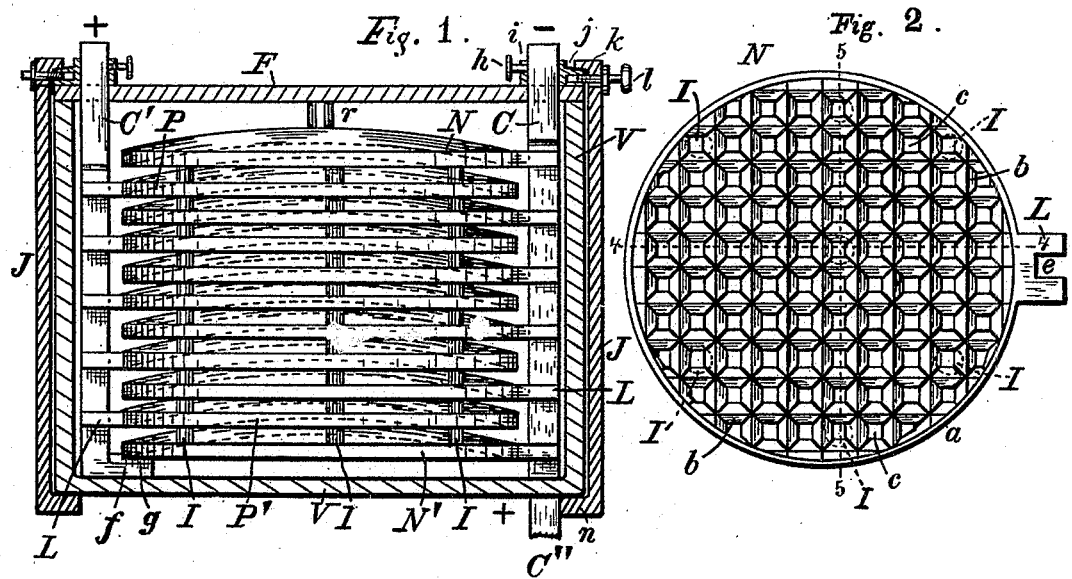
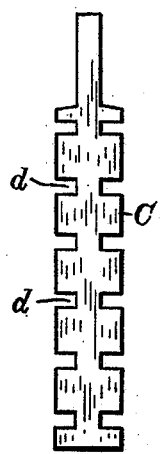
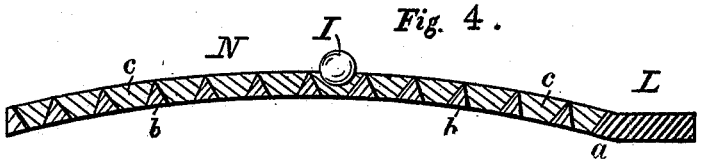
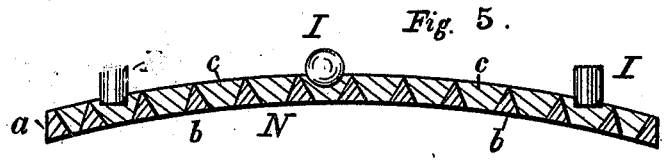
Witnesses:
R. F. Osgood.
Edwin S. Hayward, Jr.
Inventors:
Geo. F. Parker &
Charles E. Crapo.
By Geo. B. Selden,
Atty.

UNITED STATES PATENT OFFICE.

GEORGE F. PARKER AND CHARLES E. CRAPO, OF ROCHESTER, NEW YORK, ASSIGNORS OF ONE-HALF TO EDWIN S. HAYWARD, JR., OF SAME PLACE.

SECONDARY BATTERY.

SPECIFICATION forming part of Letters Patent No. 470,701, dated March 15, 1892.

Application filed April 10, 1891. Serial No. 388,375. (No model.)

*To all whom it may concern:*

Be it known that we, GEORGE F. PARKER and CHARLES E. CRAPO, citizens of the United States, residing at Rochester, in the county of Monroe, in the State of New York, have jointly invented certain Improvements in Secondary Batteries, of which the following is a specification, reference being had to the accompanying drawings.
Our invention relates to certain improvements in secondary batteries, whereby their construction is simplified and their efficiency and durability increased.

Our improvements are fully described and illustrated in the following specification and the accompanying drawings, and the novel features thereof specified in the claims annexed to the said specification.

In the accompanying drawings, representing our improvements in secondary batteries, Figure 1 is a central vertical section through a cell, showing the plates and conductors in side elevation. Fig. 2 is a plan view of one of the plates detached. Fig. 3 represents one of the conductors. Fig. 4 is a vertical section through one of the plates on the line 4 4, Fig. 2. Fig. 5 is a section through one of the plates on the line 5 5, Fig. 2.

In the construction of our improved secondary battery we cast a metallic plate, preferably of lead or some alloy of lead, with tapering recesses in its upper surface for the reception of the active material, giving to the plate a curved or arched form for the purpose of retaining the gas formed or generated in working or charging the cell or a portion of such gas. As indicated in the plan view, Fig. 2, the plate is cast with an outer rim $a$ and with a number of intersecting bars $b$, extending across from side to side and forming between them the openings or recesses $c\ c$, into which the active material is introduced in the form of paste. The sides of the bars are beveled or inclined, so that the recesses taper from above downward, thus affording a secure support to the active material. The recesses are entirely filled with the oxides constituting the active material, which comes flush with the surface of the plates above and below. Each of the series of plates is provided with projecting lugs L, which are used to connect the plates with the conductors C C'. The lugs are provided with notches $e\ e$, into which the smaller or reduced portions $d\ d$ of the conductor are inserted. The joints are secured by soldering. The conductor C extends to the bottom of the inclosing jar or vessel V, so that the plates are supported on that side thereby, a foot being formed on the lower end of the conductor, if necessary. On the other side the conductor C' is provided with a foot-piece $f$, which reaches under the lower negative plate N', Fig. 1, and sustains the same, the insulator $g$, of rubber or porcelain, being interposed to prevent short-circuiting. We also employ between the plates suitable insulators, as indicated at I, Fig. 1, between the two lower plates P' and N', which insulators are secured in place by being partially embedded in the upper surface of the active material, as represented in the sectional views, Figs. 4 and 5. The insulators are made of sufficient height to support the plate next above the one to which they are affixed by coming in contact with the lower surface of the active material therein or of one of the cross-bars $b$. In Fig. 4 the insulators are shown as consisting of glass balls I, partially embedded in the active material and of dimensions sufficient to support the plate next above it. In Fig. 5 the insulators are also represented as consisting of the cylinders I of hard rubber, porcelain, or other suitable insulating material. We have used insulators of both the styles described with good results.

A cover F is attached to the cell or receptacle V by the clamps J J. The cover is provided with a lug or projection $r$ on its lower side, which bears on the upper surface of the upper plate and produces a pressure thereon, which prevents any accidental displacement of the plates. The lug $r$ is preferably made of some suitable insulating material, or it may bear on an insulator partially embedded in the active material of the upper plate. The conductor C passes through the cover F, being secured thereto by a set-screw $h$ in a socket $i$, which projects outward and has an inclined or beveled surface $j$, upon which the correspondingly-beveled surface of a lug $k$ on the clamp-bar J is drawn up by the thumbscrew $l$, so as to secure the cover firmly in place on the jar. The thumb-screw passes through a slotted opening in the clamp and is threaded into the socket. At its lower end the clamp-bar J is provided with a lug $n$, which projects inward under the cell and may be used in case a number of cells are placed one above the other as a means of connection between the plates of different cells. In the arrangement mentioned the cell next below the one shown would have its positive terminal C'' arranged in electrical contact with the inner end of the lug $n$.

The method of using our improved secondary battery is similar to that of other batteries of the same class. The cell or cells being charged with sulphuric acid of the proper gravity, the current from any suitable source of electricity is directed through the battery, and after sufficient charging the stored electricity is then withdrawn by suitable electric connections for any purpose for which it is desired to utilize it.

It is obvious that the plates of our improved battery may be made of any suitable dimensions and that they may be square or oblong, instead of circular, as herein shown.

We claim—

1. The herein-described dome-shaped metallic plate for secondary batteries, provided with tapering recesses for the active material extending through the plate and arranged in the exciting-liquid in the horizontal position with its concavity downward, whereby the gases are retained in the concavity and the liquid is excluded therefrom, substantially as described.

2. The combination, with the recessed conductors C C', of the positive plate P and the negative plate N, each of a dome-shaped form and provided with tapering recesses for the active material extending through the plate and with laterally-projecting lugs L, adapted to engage with the conductors C C' and arranged in the exciting-liquid with their concavities downward, whereby the gases are retained therein and the liquid excluded therefrom, substantially as described.

3. The combination, with the positive plate P, of the negative plate N, each having an arched form and provided with tapering recesses for the active material and connected to their respective conductors and insulated from each other by the insulators I, embedded in the upper surface of the active material, substantially as described.

GEO. F. PARKER.
CHAS. E. CRAPO.

Witnesses:
EDWIN S. HAYWARD, Jr.,
ALBERT J. RICE.